United States Patent
Maggi et al.

(10) Patent No.: US 11,425,591 B1
(45) Date of Patent: Aug. 23, 2022

(54) BEAM SELECTION FOR CELLULAR ACCESS NODES

(71) Applicant: NOKIA SOLUTIONS AND NETWORKS OY, Espoo (FI)

(72) Inventors: Lorenzo Maggi, Paris (FR); Deepak Kumar Nayak, Bangalore (IN); Suresh Kalyanasundaram, Bangalore (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/590,326

(22) Filed: Feb. 1, 2022

(30) Foreign Application Priority Data

Feb. 10, 2021 (FI) ..................... 20215133

(51) Int. Cl.
*H04W 4/00* (2018.01)
*H04W 28/02* (2009.01)
(Continued)

(52) U.S. Cl.
CPC ........ *H04W 28/0205* (2013.01); *H04B 7/063* (2013.01); *H04B 7/0639* (2013.01);
(Continued)

(58) Field of Classification Search
CPC ... H04W 24/08; H04W 72/046; H04W 24/10; H04W 8/24; H04W 16/28; H04W 72/00;
(Continued)

(56) References Cited

U.S. PATENT DOCUMENTS

| 2010/0130223 A1 | 5/2010 | Liao et al. |
| 2017/0208479 A1 | 7/2017 | Takeda et al. |

(Continued)

FOREIGN PATENT DOCUMENTS

| CN | 109831236 A | 5/2019 | |
| WO | WO-2017184190 A1 * | 10/2017 | ............... H04B 7/04 |

(Continued)

OTHER PUBLICATIONS

Office Action dated Jul. 30, 2021 corresponding to Finnish Patent Application No. 20215133.
(Continued)

*Primary Examiner* — Thai D Hoang
(74) *Attorney, Agent, or Firm* — Squire Patton Boggs (US) LLP

(57) ABSTRACT

A solution for allocating N radio beam configurations to access nodes including, in some embodiments, a method comprising storing a beam library defining a set of radio beam configurations for a coverage area. A coverage area is divided into sub-areas, and a set of channel quality metrics is collected, as is a traffic density parameter for each sub-area. The following steps are performed: selecting N radio beam configurations from the set of radio beam configurations; mapping each sub-area with one of the selected N radio beam configurations; computing a service performance for the selected N radio beam configurations; the service performance is weighted by the traffic density parameters. The service performance are stored as linked to each radio beam configuration of the selected N radio beam configurations. Based on the stored service performances, a set of N radio beam configurations is selected and the N radio beam configurations are allocated.

15 Claims, 9 Drawing Sheets

(51) Int. Cl.
*H04W 72/04* (2009.01)
*H04W 28/18* (2009.01)
*H04B 7/06* (2006.01)

(52) U.S. Cl.
CPC ....... *H04W 28/0273* (2013.01); *H04W 28/18* (2013.01); *H04W 72/046* (2013.01)

(58) Field of Classification Search
CPC ......... H04W 28/0205; H04W 28/0273; H04W 28/18; H04B 7/063; H04B 7/0639
USPC .................................. 370/329–330, 335–345
See application file for complete search history.

(56) References Cited

U.S. PATENT DOCUMENTS

| | | | | |
|---|---|---|---|---|
| 2017/0231011 | A1* | 8/2017 | Park | H04W 74/0841 |
| 2018/0227026 | A1* | 8/2018 | Kim | H04B 7/0695 |
| 2019/0372644 | A1* | 12/2019 | Chen | G06N 3/126 |
| 2020/0314759 | A1* | 10/2020 | Luna | H04W 52/0222 |

FOREIGN PATENT DOCUMENTS

| | | | | |
|---|---|---|---|---|
| WO | WO-2018031908 A1 * | 2/2018 | ........... | H04B 7/0408 |
| WO | WO 2020/055408 A1 | 3/2020 | | |

OTHER PUBLICATIONS

Finnish Search Report dated Jul. 30, 2021 corresponding to Finnish Patent Application No. 20215133.
Office Action dated Jan. 13, 2022 corresponding to Finnish Patent Application No. 20215133.
Communication of Acceptance—section 29a of Patents Decree dated Jan. 27, 2022 corresponding to Finnish Patent Application No. 20215133.
Jienan Chen et al., "Intelligent Massive MIMO Antenna Selection Using Monte Carlo Tree Search," IEEE Transactions on Signal Processing, vol. 67, No. 20, Oct. 15, 2019.
Yawen Chen et al., "Reinforcement Learning Meets Wireless Networks: A Layering Perspective," IEEE Internet of Things Journal, vol. 8, No. 1, Jan. 1, 2021.
Extended European Search Report corresponding to EP Application No. 22154429.9, dated Jul. 4, 2022.

* cited by examiner

BEAM SELECTION FOR CELLULAR ACCESS NODES

FIELD

Various embodiments described herein relate to the field of wireless communications and, particularly, to selection of radio beams for access nodes of a cellular communication system.

BACKGROUND

Modern access nodes of cellular communication systems are provided with antenna arrays and signal processing capabilities for operating cells via various radio beam configurations. An access node may generate radio beams with various characteristics in terms of beam direction and width from a site of the access node. Multiple beams may be operational concurrently. Different sets of radio beam configurations may provide different performance characteristics, depending on spatial distribution of terminal devices in a cell, their traffic demands, interference from neighbour cells, etc. Therefore, there may be a need to update the set of radio beam configurations at times.

BRIEF DESCRIPTION

Some aspects of the invention are defined by the independent claims.

Some embodiments of the invention are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided an apparatus for allocating N radio beam configurations to access nodes, comprising: at least one processor; and at least one memory including computer program code, the at least one memory and computer program code configured to, with the at least one processor, cause the apparatus to perform the following: storing, in the at least one memory, a beam library defining a set of radio beam configurations for a coverage area of a plurality of cells managed by the access nodes; dividing the coverage area into sub-areas; collecting a set of channel quality metrics where each channel quality metric indicates, in one of the sub-areas, channel quality for a radio beam configuration of the beam library; collecting a traffic density parameter for each sub-area, the traffic density parameter indicating an amount of data traffic in the sub-area; performing the following steps a) to d) for a plurality of different sets of N radio beam configurations:

a) selecting N radio beam configurations from the set of radio beam configurations, b) mapping, on the basis of the set of channel quality metrics, each sub-area a radio beam that provides the highest channel quality metric for the N radio beam configurations selected in step a), thereby performing cell association such that a different number of beams is mapped to different cells, and reiterating the cell associations of the sub-areas one-by-one by computing, for a sub-area, a signal-to-interference metric for each of the plurality of cells by considering the other sub-areas associated to different cells as sources of interferences and by selecting a cell providing the greatest signal-to-interference metric, thereby inducing at least one cell change to the mapping;

c) computing, on the basis of the mapping and the traffic density parameters, a service performance for the selected N radio beam configurations, wherein the service performance is weighted by the traffic density parameters, and d) storing the service performance as linked to each radio beam configuration of the selected N radio beam configurations;

selecting, on the basis of the stored service performances, a set of N radio beam configurations and allocating the N radio beam configurations to the access nodes.

In an embodiment, the at least one memory and computer program code configured to, with the at least one processor, cause the apparatus to perform the steps a) to d) for at least a majority of possible combinations of N radio beam configurations in the beam library.

In an embodiment, the at least one memory and computer program code configured to, with the at least one processor, cause the apparatus to use at least some of the radio beam configurations in the plurality of different sets of N radio beam configurations, to store in step d) the service performance for each use of the at least some of the radio beam configurations separately, thereby storing multiple service performance values for each of the at least some of the radio beam configurations, and to use the stored multiple service performance values in subsequently performed steps a).

In an embodiment, a probability of selecting in step a) a radio beam configuration that has a greater service performance, in terms of the stored service performance values, is greater than a probability of selecting a radio beam configuration that has a smaller service performance in terms of the stored service performance values.

In an embodiment, the at least one memory and computer program code configured to, with the at least one processor, cause the apparatus to determine a fairness parameter defining a target between a maximum throughput and a maximum coverage for the set of N radio beam configurations, to compute the service performance for the selected N radio beam configurations in step c) by using the fairness parameter, and to select the set of N radio beam configurations on the basis of the computed service performances.

In an embodiment, said N radio beam configurations comprise a determined number of radio beam configurations per cell, and wherein the at least one memory and computer program code configured to, with the at least one processor, cause the apparatus to perform steps a) by using a Monte-Carlo tree search algorithm using a selection tree formed of the radio beam configurations in the beam library and comprising the following steps:

i) selecting a cell and a radio beam configuration for the cell, wherein the radio beam configuration is selected on the basis of stored service performances of the radio beam configurations, if any, and the number of times each radio beam configuration has already been selected in previous iterations of step a, if any;

ii) determining whether or not the selected radio beam configuration is linked in the selection tree to a radio beam configuration that has been previously selected in another iteration of step a) and, if said another radio beam configuration has been previously selected, returning to step i) to select a further radio beam configuration;

if said another radio beam configuration has not been previously selected, proceeding to step iii);

iii) selecting arbitrarily the remaining radio beam configurations such that said N radio beam configurations are selected.

In an embodiment, the at least one memory and computer program code configured to, with the at least one processor, cause the apparatus to perform in step b) at least the following:

I. computing, for a sub-area, a signal-to-interference metric for each of the cells by considering the other sub-areas associated to different cells as sources of interference and selecting a cell association for the sub-area on the basis of the computed signal-to-interference metrics; and II. repeating step I. for the sub-area and the other sub-areas a plurality of times before proceeding to step c).

In an embodiment, the at least one memory and computer program code configured to, with the at least one processor, cause the apparatus to perform steps a) to d) during operation of the access nodes, to detect an event in the operation that requires modification of the radio beam configurations currently applied by the access nodes, to interrupt, in response to the detection, said performing the steps a) to d) and to select the set of N radio beam configurations on the basis of the available stored service performances.

According to an aspect, there is provided a computer-implemented method for allocating N radio beam configurations to access nodes, comprising: storing, in at least one memory, a beam library defining a set of radio beam configurations for a coverage area of a plurality of cells managed by the access nodes; dividing the coverage area into sub-areas; collecting a set of channel quality metrics where each channel quality metric indicates, in one of the sub-areas, channel quality for a radio beam configuration of the beam library; collecting a traffic density parameter for each sub-area, the traffic density parameter indicating an amount of data traffic in the sub-area; performing the following steps a) to d) for a plurality of different sets of N radio beam configurations:

a) selecting N radio beam configurations from the set of radio beam configurations, b) mapping, on the basis of the set of channel quality metrics, each sub-area a radio beam that provides the highest channel quality metric for the N radio beam configurations selected in step a), thereby performing cell association such that a different number of beams is mapped to different cells, and reiterating the cell associations of the sub-areas one-by-one by computing, for a sub-area, a signal-to-interference metric for each of the plurality of cells by considering the other sub-areas associated to different cells as sources of interferences and by selecting a cell providing the greatest signal-to-interference metric, thereby inducing at least one cell change to the mapping;

c) computing, on the basis of the mapping and the traffic density parameters, a service performance for the selected N radio beam configurations, wherein the service performance is weighted by the traffic density parameters, and d) storing the service performance as linked to each radio beam configuration of the selected N radio beam configurations;

selecting, on the basis of the stored service performances, a set of N radio beam configurations and allocating the N radio beam configurations to the access nodes.

In an embodiment, the steps a) to d) are performed for at least a majority of possible combinations of N radio beam configurations in the beam library.

In an embodiment, at least some of the radio beam configurations are used in the plurality of different sets of N radio beam configurations, the method comprising storing in step d) the service performance for each use of the at least some of the radio beam configurations separately, thereby storing multiple service performance values for each of the at least some of the radio beam configurations, and using the stored multiple service performance values in subsequently performed steps a).

In an embodiment, a probability of selecting in step a) a radio beam configuration that has a greater service performance, in terms of the stored service performance values, is greater than a probability of selecting a radio beam configuration that has a smaller service performance in terms of the stored service performance values.

In an embodiment, the method further comprises determining a fairness parameter defining a target between a maximum throughput and a maximum coverage for the set of N radio beam configurations, computing the service performance for the selected N radio beam configurations in step c) by using the fairness parameter, and selecting the set of N radio beam configurations on the basis of the computed service performances.

In an embodiment, said N radio beam configurations comprise a determined number of radio beam configurations per cell, and wherein the steps a) are performed by using a Monte-Carlo tree search algorithm using a selection tree formed of the radio beam configurations in the beam library and comprising the following steps:

i) selecting a cell and a radio beam configuration for the cell, wherein the radio beam configuration is selected on the basis of stored service performances of the radio beam configurations, if any, and the number of times each radio beam configuration has already been selected in previous iterations of step a, if any;

ii) determining whether or not the selected radio beam configuration is linked in the selection tree to a radio beam configuration that has been previously selected in another iteration of step a) and, if said another radio beam configuration has been previously selected, returning to step i) to select a further radio beam configuration;

if said another radio beam configuration has not been previously selected, proceeding to step iii);

iii) selecting arbitrarily the remaining radio beam configurations such that said N radio beam configurations are selected.

In an embodiment, the method further comprises in step b) at least the following:

I. computing, for a sub-area, a signal-to-interference metric for each of the cells by considering the other sub-areas associated to different cells as sources of interference and selecting a cell association for the sub-area on the basis of the computed signal-to-interference metrics; and II. repeating step I. for the sub-area and the other sub-areas a plurality of times before proceeding to step c).

In an embodiment, steps a) to d) are performed during operation of the access nodes, and wherein upon detecting an event in the operation that requires modification of the radio beam configurations currently applied by the access nodes, said performing the steps a) to d) is interrupted and the set of N radio beam configurations is selected on the basis of the available stored service performances.

According to an aspect, there is provided a computer program product embodied on a computer-readable medium and comprising a computer program code readable by a computer, wherein the computer program code configures the computer to carry out a computer process for allocating N radio beam configurations to access nodes, the computer process comprising: storing, in at least one memory, a beam library defining a set of radio beam configurations for a coverage area of a plurality of cells managed by the access nodes; dividing the coverage area into sub-areas; collecting a set of channel quality metrics where each channel quality metric indicates, in one of the sub-areas, channel quality for a radio beam configuration of the beam library; collecting a traffic density parameter for each sub-area, the traffic density parameter indicating an amount of data traffic in the sub-area; performing the following steps a) to d) for a plurality of different sets of N radio beam configurations:

a) selecting N radio beam configurations from the set of radio beam configurations, b) mapping, on the basis of the set of channel quality metrics, each sub-area a radio beam that provides the highest channel quality metric for the N radio beam configurations selected in step a), thereby performing cell association such that a different number of beams is mapped to different cells, and reiterating the cell associations of the sub-areas one-by-one by computing, for a sub-area, a signal-to-interference metric for each of the plurality of cells by considering the other sub-areas associated to different cells as sources of interferences and by selecting a cell providing the greatest signal-to-interference metric, thereby inducing at least one cell change to the mapping;

c) computing, on the basis of the mapping and the traffic density parameters, a service performance for the selected N radio beam configurations, wherein the service performance is weighted by the traffic density parameters, and d) storing the service performance as linked to each radio beam configuration of the selected N radio beam configurations;

selecting, on the basis of the stored service performances, a set of N radio beam configurations and allocating the N radio beam configurations to the access nodes.

LIST OF DRAWINGS

Embodiments are described below, by way of example only, with reference to the accompanying drawings, in which FIG. 1 illustrates a wireless communication scenario to which some embodiments of the invention may be applied;

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
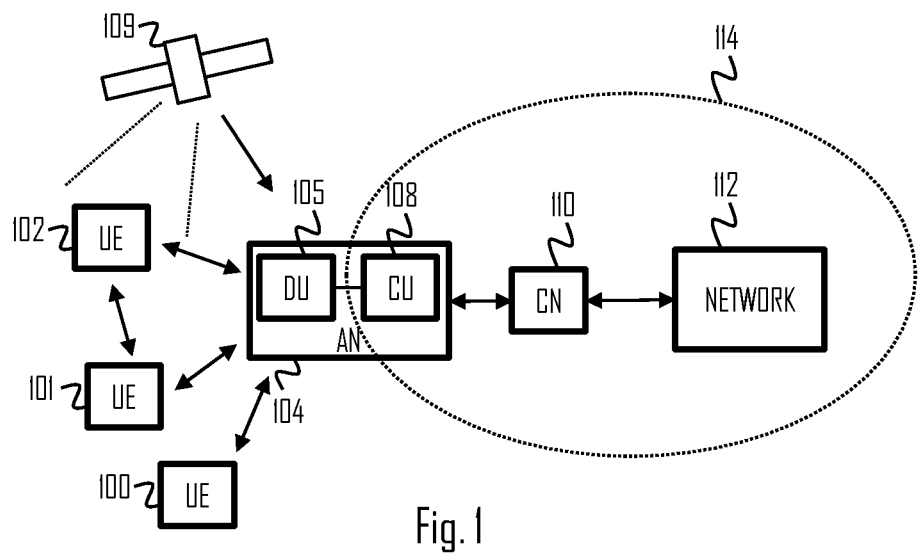

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows terminal devices or user devices 100 and 102 configured to be in a wireless connection on one or more communication channels in a cell with an access node (such as (e/g)NodeB) 104 providing the cell. (e/g)NodeB refers to an eNodeB or a gNodeB, as defined in 3GPP specifications. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobility management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station. 5G specifications define two relay modes: out-of-band relay where same or different carriers may be defined for an access link and a backhaul link; and in-band-relay where the same carrier frequency or radio resources are used for both access and backhaul links. In-band relay may be seen as a baseline relay scenario. A relay node is called an integrated access and backhaul (IAB) node. It has also inbuilt support for multiple relay hops. IAB operation assumes a so-called split architecture having CU and a number of DUs. An IAB node contains two separate functionalities: DU (Distributed Unit) part of the IAB node facilitates the gNB (access node) functionalities in a relay cell, i.e. it serves as the access link; and a mobile termination (MT) part of the IAB node that facilitates the backhaul connection. A Donor node (DU part) communicates with the MT part of the IAB node, and it has a wired connection to the CU which again has a connection to the core network. In the multihop scenario, MT part (a child IAB node) communicates with a DU part of the parent IAB node.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equip-ment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and typically fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network or the Internet, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 105) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 109 in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

Figure 2:
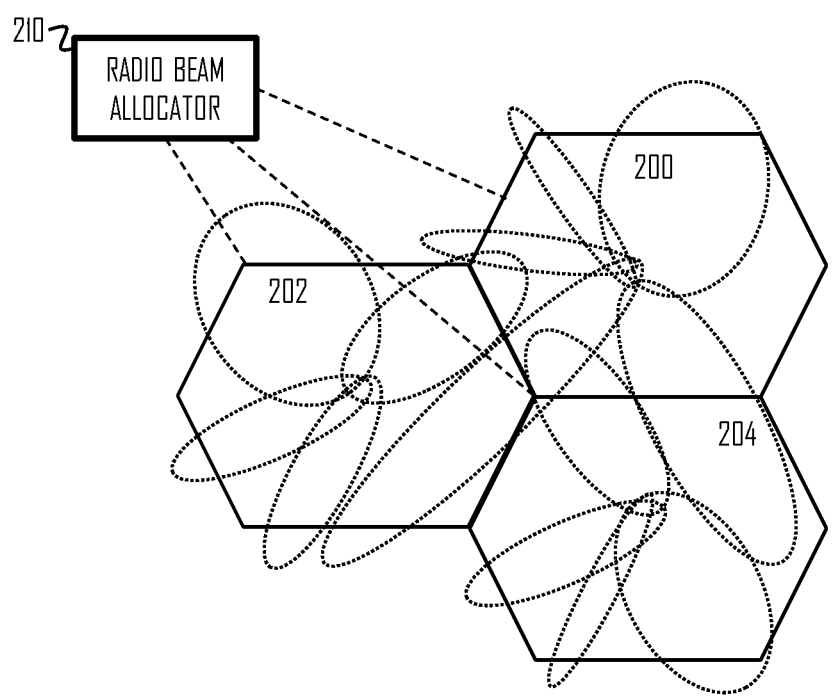
FIG. 2 illustrates a cellular communication arrangement with various radio beam configurations.

FIG. 2 illustrates a scenario where a number of cells 200, 202, 204 are illustrated. Each cell may be managed by an access node, e.g. similar to the access node 104, or an access node may control multiple cells via sectorization. However, let us consider in the following embodiments the scenario with multiple cells managed by multiple access nodes. Accordingly, a coverage area under consideration is a combined coverage area of the multiple cells. FIG. 2 illustrates a simplified scenario with only three cells, but the number of cells may be different in other scenarios. In FIG. 2, an access node may be positioned at the centre of each cell 200 to 204. The combined coverage area of the cells may be covered by the access nodes via different arrangements of radio beam configurations. A radio beam configuration may be defined in terms of a beam direction and beam width in three dimensions. In FIG. 2, the radio beam configurations are illustrated with the dotted ellipses spanning from the centres of the hexagonal cells. A single access node may operate multiple radio beam configurations to cover the whole coverage area of the cell, as illustrated in FIG. 2. In some cases, even the boundaries of the cells may be subject to change as a result of changing the radio beam configurations of the cells, and this is illustrated by some radio beams extending to the neighbouring cells. By adapting the radio beam configurations, in particular by taking into account the combined coverage of the cells and access nodes, the system coverage and performance may be improved. A radio beam allocator 210 may be a central entity that jointly selects and allocates the radio beam configurations to the access nodes and to the cells according to embodiments described below.

Before proceeding to describe the embodiments, let us define some terms and parameters used below. Let us consider a set of C cells, and each cell j is assigned with $N_B$ beams from a beam library $U^j$. We define $B^j \subset U^j$ as the chosen beams in cell j. A set of beams SoB is the union of all the allocated beams across all cells, namely SoB=$B^1 \cup B^2 \cup \ldots \cup B^C$. In the following the set of beams may be understood as equal to a set of radio beam configurations. Let us remark that beam library may include a large number of beams with different beam-pointing directions in azimuth and elevation, different beam widths in azimuth and elevation that allows optimization of the system performance.

Let us discretize the coverage area of interest (the combined coverage area of the cells) into (x,y,z)s ("tiles") each identified by its coordinates $\omega_i$ (x, y, z)sub-area may equal to a cell provided by an access node, or it may be a sub-area within a cell. A coverage area of a cell may comprise a plurality of sub-areas, depending on the desired spatial resolution. Each $\omega_i$ sub-area in the network coverage area ρ(x,y,z)a traffic density associated with it, the traffic density given by $\omega_i$ (x, y, z) Each sub-area may be substantially smaller than a coverage area of a single cell, and the area covered by each sub-area may be selected according to the design, e.g. available computational resources. We remark that these $\omega_i$ coordinates correspond to a (r, θ, φ) local coordinate system (GCS), while, for the purposes of the beamforming gain computation, it may be more convenient to use polar coordinates $\omega_i$ with respect to a local c(x, y, z) oordinate system centred at the access node of the cell to which the location (x, y, z) would be associated.

Figure 3:
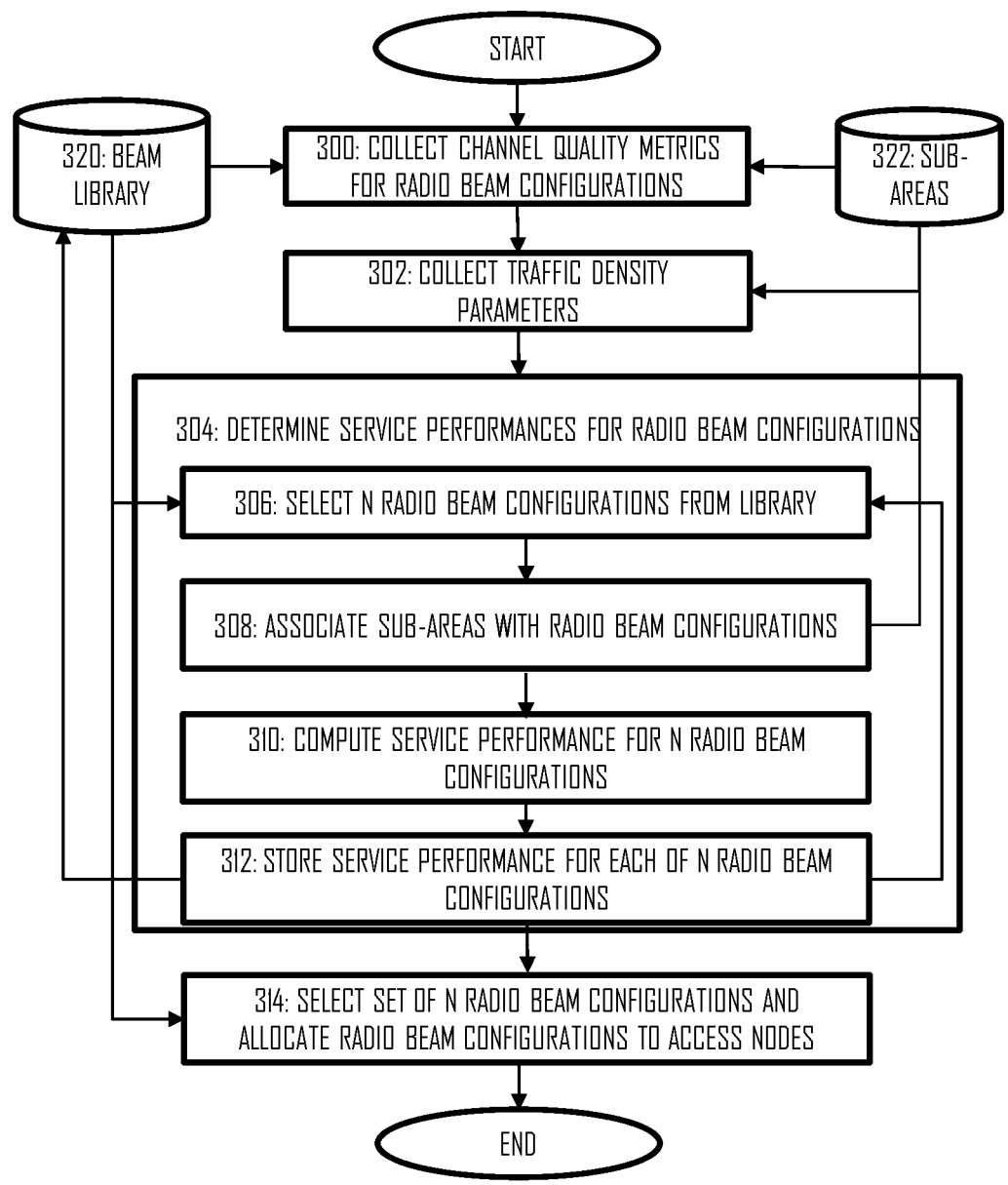
FIG. 3 illustrates a process for selecting radio beam configurations for a plurality of access nodes according to an embodiment.

Let us then describe a process for selecting N radio beam configurations for the access nodes. FIG. 3 illustrates an embodiment of such a process performed by the radio beam allocator 210. The radio beam allocator may be connected to the access nodes, and it may reside in a radio access network or in the core network of the cellular communication system. Referring to FIG. 3, the process comprises: storing, in a memory, a beam library 320 defining a set of radio beam configurations for a coverage area of a plurality of cells managed by the access nodes; dividing the coverage area into sub-areas and storing definitions of the sub-areas in a memory 322, e.g. in terms of location coordinates (x,y,z); collecting (block 300) a set of channel quality metrics where each channel quality metric indicates, in one of the sub-areas, channel quality for a radio beam configuration of the beam library; collecting (block 302) a traffic density parameter for each sub-area, the traffic density parameter indicating an amount of data traffic in the sub-area; performing (block 304) the following steps a) to d) for a plurality of different sets of N radio beam configurations:

a) selecting (block 306) N radio beam configurations from the set of radio beam configurations, b) mapping (block 308), on the basis of the set of channel quality metrics, each sub-area with one of the selected N radio beam configurations, c) computing (block 310), on the basis of the mapping and the traffic density parameters, a service performance for the selected N radio beam configurations, wherein the service performance is weighted by the traffic density parameters, and d) storing (block 312) the service performance as linked to each radio beam configuration of the selected N radio beam configurations; and selecting (block 314), on the basis of the stored service performances, a set of N radio beam configurations and allocating the N radio beam configurations to the access nodes.

An advantage provided by the joint selection of the radio beam configurations is that the selection is not only the local optimization but provides an optimized solution for a wider area. Therefore, performance improvements may be acquired on a wider scale. It also reduces adverse effects of local estimations where each cell would be considered separately and potentially battle against one another.

In an embodiment, blocks 300 and 302 are performed during operation of the access nodes. The access nodes may collect the channel quality metrics from radio links they operate. Embodiments of the channel quality metrics include a reference signal reception power (RSRP) measured by the access nodes from uplink reference signals transmitted by the terminal devices and/or by the terminal devices from downlink reference signals transmitted by the access nodes, a path loss estimated by the access nodes and/or the terminal devices, a channel state information (CSI) or a channel quality indicator (CQI) defined in system specifications for cellular communication systems, and a signal-to-interference-plus-noise power ratio (SINR). The traffic density per sub-area may be measured by the access nodes from traffic volume of each radio link operated by the access node. The access nodes may map the terminal devices to the sub-areas by using positioning techniques such as a global navigation satellite system, angle-of-arrival positioning, and/or multi-lateration positioning (e.g. a time-difference-of-arrival, TDOA, measurements) performed by the access nodes.

In an embodiment, the steps a) to d) are performed for at least a majority of possible combinations of N radio beam configurations in the beam library. In an embodiment, the steps a) to d) are performed for at least some of the radio beam configurations of the radio beam library 300 multiple times, in different combinations of N radio beam configurations. For example, a given radio beam configuration may be combined with different sets of other radio beam configurations in different iterations of the steps a) to d) and, accordingly, the performance provided by the radio beam configuration with the different sets of other radio beam configurations becomes evaluated. Accordingly, in each iteration of the steps a) to d), a new combination of N radio beam configurations is tested and its performance evaluated and stored. In an embodiment, the majority of the radio beam configurations in the beam library 300 is tested in multiple different combinations of N radio beam configurations.

Figure 4:
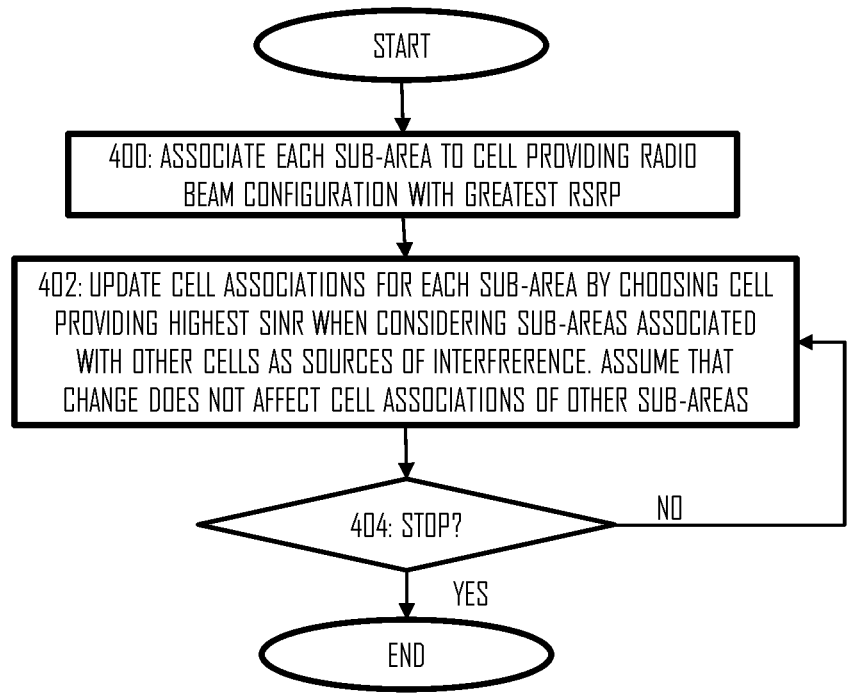
FIG. 4 illustrates a process for making cell associations for a selected radio beam configuration according to an embodiment.

Let us then describe some embodiments of the various steps of the process of FIG. 3. FIG. 4 illustrates an embodiment of block 308. Before proceeding with the description of FIG. 4, let us define used as an embodiment of the channel quality metric. Signal-to-interference (SIR or SINR) is used as a parameter in the embodiments described below, and let us describe the SINR in the present context. Let us suppose that cell j=1, . . . , C deploys the beams $B^j$, composed of $N_B$ beams chosen out of the beam library $U^{(j)}$. $G_b(x, y, z)$ denotes a beamforming gain of beam b in the quantized sub-area (x, y, z). Let T2C(•) denote the tile-to-cell (equal to sub-area-to-cell) association T2C(x, y, z) that prescribes which cell serves each sub-area (x, y, z). Once the T2C is chosen, the radio beam that serves a sub-area (x, y, z) may be the one guaranteeing the highest received power among the available set of beams (GoB), and it is defined as:

$$b(x,y,z) = \mathrm{argmax}_{b \in B^{T2C(x,y,z)}} G_b(x,y,z).$$

Let us now define the interference $I_{T2C}(x, y, z)$ suffered at the tile or sub-area (x, y, z) given a certain tile-to-cell (T2C) association c(•). The interference may come from the signals coming from all tiles (x', y', z') that are not associated with the same cell, and it can be written as:

$$I_{T2C}(x, y, z) = \sum_{\substack{(x',y',z'): \\ c(x',y',z') \neq c(x,y,z)}} \eta(x', y', z') G_{b(x',y',z')} L^{c(x',y',z')}(x, y, z) \quad (1)$$

where $L^j(x,y,z)$ is the path gain from the serving access node j at the location (x, y, z) and $\eta(x, y, z)$ is the average percentage of time that there is a transmission to tile (x, y, z), computed as:

$$\eta(x, y, z) = \frac{\rho(x, y, z)}{\sum_{\substack{(x',y',z'): \\ c(x',y',z')=c(x,y,z)}} \rho(x', y', z')} \quad (2)$$

Let us then define the SINR perceived in each sub-area (x, y, z) as $$SINR_{GoB,T2C}(x, y, z) = \frac{L^{T2C(x,y,z)}(x, y, z) G_{b(x,y,z)}(x, y, z)}{\sigma^2 + I_{T2C}(x, y, z)} \quad (3)$$

where $\sigma^2$ is the thermal noise power. In other embodiments, the SINR could be measured or estimated in a different manner. For example, the parameter $\eta(x, y, z)$ may be omitted, or equivalently set equal to 1, for the sake of lower complexity. In another embodiment, the term η(x, y, z) may be computed from Equation (2) by replacing ρ(x,y,z) (respectively, ρ(x',y',z')) by the ratio of ρ(x,y,z) (respectively, ρ(x',y',z')) to the corresponding spectral efficiency that can be realized in sub-area (x, y, z) (respectively, (x', y', z')).

The SINR expression in Equation (3) depends on the T2C that assigns each sub-area to a cell. In turn, the T2C itself depends on the SINR, since each (potential) terminal device in each sub-area will attach to a cell that provides the highest SINR. Therefore, it may be impractical to assume to know in advance, before the selected set of N radio beam configurations is actually deployed in the access nodes, the tile-to-cell association T2C* implemented by the terminal devices. Yet, a good way to estimate it and disentangle the mutual relationship between SINR and T2C is to estimate T2C* as one from which no terminal device in each sub-area has the interest to deviate unilaterally. In other words, a terminal device may assume that it would not achieve a higher SINR by attaching to a cell differing from T2C*(x, y, z), i.e. it assumes $$SINR_{GoB,T2C^*}(x,y,z) \geq SINR_{GoB,T2C}(x,y,z)$$

where T2C(x', y', z')=T2C*(x', y', z') for (x', y', z')≠(x, y, z) and T2C(x, y, z)≠T2C*(x, y, z). Technically speaking, this is a Nash equilibrium known in game theory. In order to compute such a Nash equilibrium, a best response algorithm also known in the game theory may be used. The best response algorithm works iteratively and, for each sub-area, finds the best cell association with the assumption that the cell associations of the other sub-areas remain unchanged. FIG. 4 illustrates an embodiment of such a best response algorithm.

Referring to FIG. 4, let us describe a general idea of using the SINR as a metric for cell associations according to the best response algorithm. In this embodiment, the above-described step b) comprises mapping, on the basis of the set of channel quality metrics, each sub-area a radio beam that provides the highest channel quality metric for the N radio beam configurations selected in step a), thereby performing cell association such that a different number of beams is mapped to different cells, and reiterating the cell associations of the sub-areas one-by-one by computing, for a sub-area, a signal-to-interference metric for each of the plurality of cells by considering the other sub-areas associated to different cells as sources of interferences and by selecting a cell providing the greatest signal-to-interference metric, thereby inducing at least one cell change to the mapping. Multiple reiterations may be performed per sub-area. Let us describe more detailed embodiments with reference to FIG. 4.

In block 400, the best response algorithm is initialized by associating, on the basis of the channel quality metrics collected in block 300, each sub-area to a radio beam that provides the highest channel quality for the N radio beams selected in block 306. This is basically cell association as well because each radio beam is linked to one of the cells. Then, the best response is performed by looping block 402. In block 402, the cell associations of the sub-areas are (re)iterated one-by-one by computing, for a sub-area, a signal-to-interference metric (e.g. the $SINR_{GoB,T2C}(x,y,z)$) for each of the cells by considering the other sub-areas associated to different cells as sources of interference, and by selecting a cell providing the greatest signal-to-interference metric. The assumption in the selection may be that the selections for the other sub-areas will not be affected by the change. In other words, the selection does not take into account the consequences of the selection to other sub-areas. That characteristic will be taken into account via the iterations. Because the criterion in block 402 (SINR) differs from the criterion in block 400 (e.g. RSRP), at least one cell change occurs during iterations of block 402. This causes a change in the interference scenario and the SINR metrics of the other sub-areas that may induce further cell changes. Accordingly, each sub-area may be iterated more than once in the process of FIG. 4. As a criterion for stopping the iterations, a maximum number of iterations may be predefined. Another criterion may be to evaluate the number of cell changes during an iteration round with one iteration per sub-area. If the number of cell changes is below a threshold, e.g. no cell changes occurred, the process may end.

In an embodiment, a fairness parameter defining a target trade-off between maximizing the average SINR and the SINR of the worse-off users for the set of N radio beam configurations is used, and the fairness parameter may be used as an input in block 314. A goal in block 314 may be to find the set of radio beam configurations that provides the best performance in the combined coverage area of the access nodes for which the set of N radio beam configurations is selected. To achieve fairness across terminal device, a utility function $f^\alpha(\bullet)$ may be defined as $$f^\alpha(SINR) = \begin{cases} (1-\alpha)^{-1} SINR^{1-\alpha}, & \text{if } \alpha \neq 1 \\ \log(SINR), & \text{if } \alpha = 1 \end{cases} \quad (4)$$

where different values of α correspond to different utility metrics:
  a. α=0 à max-sum-SINR
  b. α=1→max sum SINR in decibels [dB]
  c. α=∞→max-min fairness
  d. 1<α<∞ various degrees of trade-off between improving the average and the worse-off SINR tiles.

Figure 5:
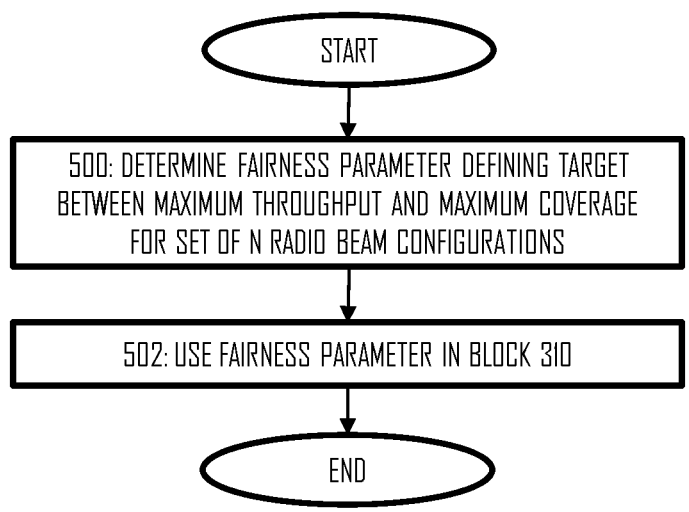
FIG. 5 illustrates an embodiment for taking fairness into account in when computing system performance.

The function of the fairness metric α may be understood from the following perspective. Selection α=0 indicates that the fairness metric causes preference of the average SINR over the SINR of the worse-off tiles, while selection α=∞ or selection of a very high value for α indicates that the fairness metric causes preference of the SINR of the worse-off tiles over the average SINR. α may be chosen according to the desired fairness (e.g. preference between the average SINR and the worst-case SINR). Our goal is to compute the set of beams (GoB) that maximizes the sum-utility of the SINR distribution across the sub-areas, and this may be computed in block 314 as follows:

$$\max_{GoB} \sum_{(x,y,z)} \rho(x,y,z) f^\alpha(SINR_{GoB,T2C^*}(x,y,z)) := r(GoB) \quad (5)$$

where the parameter $r(GoB)=\sum_{(x,y,z)}\rho(x, y, z)f^\alpha(SINR_{GoB,T2C^*}(x,y,z))$ may be computed in block 310. r(GoB) may be considered as an embodiment of the service performance or a 'reward' of the set of radio beam configurations selected in block 306. FIG. 5 illustrates a procedure for computing the reward or the service performance. Referring to FIG. 5, the fairness parameter is defined in block 500, and the service performance for the selected N radio beam configurations is computed in block 502 by using the fairness parameter. Since the fairness is included into the computation of the service performance, the fairness is inherently included as a parameter in the selection of the set of N radio beam configurations in block 314.

In an embodiment of block 306, a Monte-Carlo tree search (MCTS) algorithm is used for selecting the N radio beam configurations to be tested for the service performance. In computer science, the MCTS is known as a heuristic search algorithm for decision processes that uses randomness for solving complex deterministic problems. MCTS is a four-step procedure that is iterated over and over again. The four steps include 1. selection, starting from a root node, until a leaf node is found. The leaf node is a node that has a child node which has not been reached in earlier iterations
2. expansion to such a child node
3. simulation by randomly selecting nodes until the end of the tree, thus producing a result of the simulation
4. backpropagation where the result is stored for every node on the path chosen in steps 1 to 3.

Now, reflecting the MCTS to the present embodiments, a node may be understood as a new radio beam configuration or, from another perspective, a state where a new radio beam configuration is added to the set of radio beam configurations represented by the parent node. FIGS. 6A to 6D illustrate the selection procedure according to the MCTS algorithm. With respect to the definition of the 'tree structure', the radio beam selection may have desired degrees of freedom that may be dependent or independent on the travelled route (past selections) in the tree. For example, selection of a radio beam configuration may preclude subsequent selections of some of the other radio beam configurations, thus following a pre-set or predetermined 'tree structure'. However, in other embodiments the algorithm may have in every step of the tree complete freedom to select any radio beam configuration from the beam library, with the ruling that already selected radio beam configuration(s) cannot be selected again for the same 'tree'. In this case, there is no pre-set 'tree structure' but a tree branch is formed by the selections.

Figure 6A:
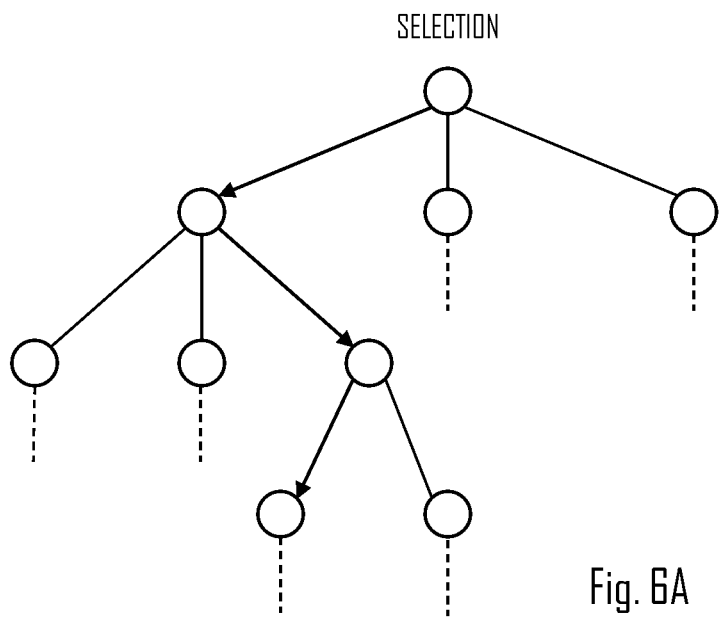
FIGS. 6A to 6D illustrate steps of a Monte-Carlo tree search algorithm used for selecting radio beam configurations according to an embodiment.
Figure 6B:
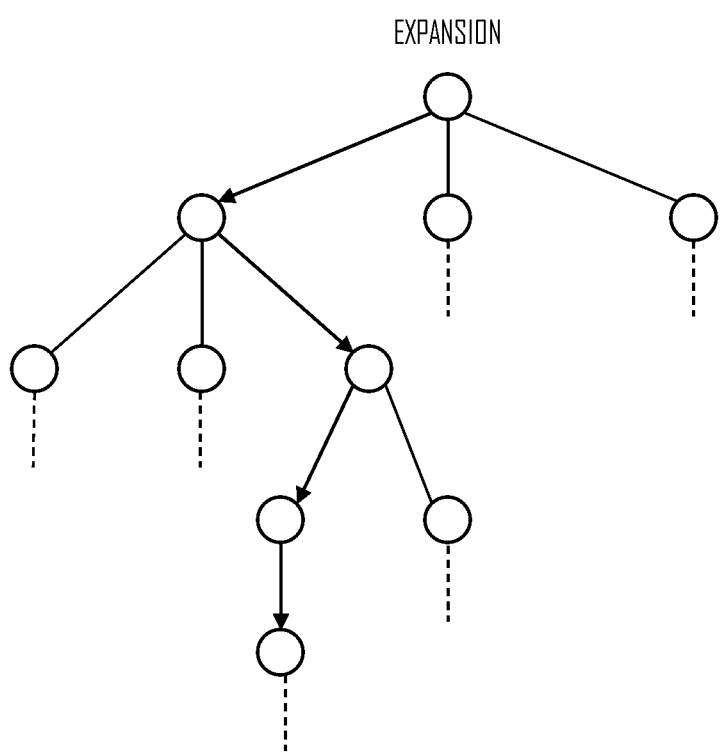

Referring to FIG. 6A, the selection phase may include selecting a set of radio beam configurations from the root to a leaf node that has not been expanded to in previous iterations of the MCTS. The selection may be completely random, or it may have deterministic characteristics. The service performance computed in the past iterations may be stored for every node, as described above, and it may be used as a parameter for the determinism. A selection criterion may take into account an average of the service performances (reward) and/or a maximum of the service performances. This allows to steer the tree exploration procedure towards more promising branches. A metric for using as the selection criterion for a node may be defined as follows:

$$(1 - \text{max}VS\text{mean}) * \text{average reward} + \quad (6)$$

$$\text{max}VS\text{mean} * \text{maximum reward} + 2C_{exploration}\sqrt{\frac{\ln(\text{visits to parent})}{\text{visits to node}}}$$

where maxVSmean∈[0,1] is an input parameter defining the weight between the average and maximum reward in the selection. As described in Equation (6), another criterion may be the number of visits to the node and the number of visits to its parent node. Parameter $C_{exploration} \geq 0$ defines a weight for the numbers of visits. This parameter controls the random characteristic in the selection, and it may be set to zero after every radio beam configuration has been selected in the selecting and/or expansion step of the MCTS. Before that, the parameter may be set to one. The radio beam configuration (node) providing the greatest metric of Equation (6) may be selected, and the selection may proceed until a node (radio beam configuration) is found that has at least one child node that has not yet been selected in the process of block 306. Thereafter, the process proceeds to the expansion step (FIG. 6B) where one of such child nodes is selected. The selection may be random or according to Equation (6) with the exception that, since the child node(s) have/has not been visited, the parameter using the numbers of visits may be omitted. The expansion may be understood as exploration of the child node.

Figure 6C:
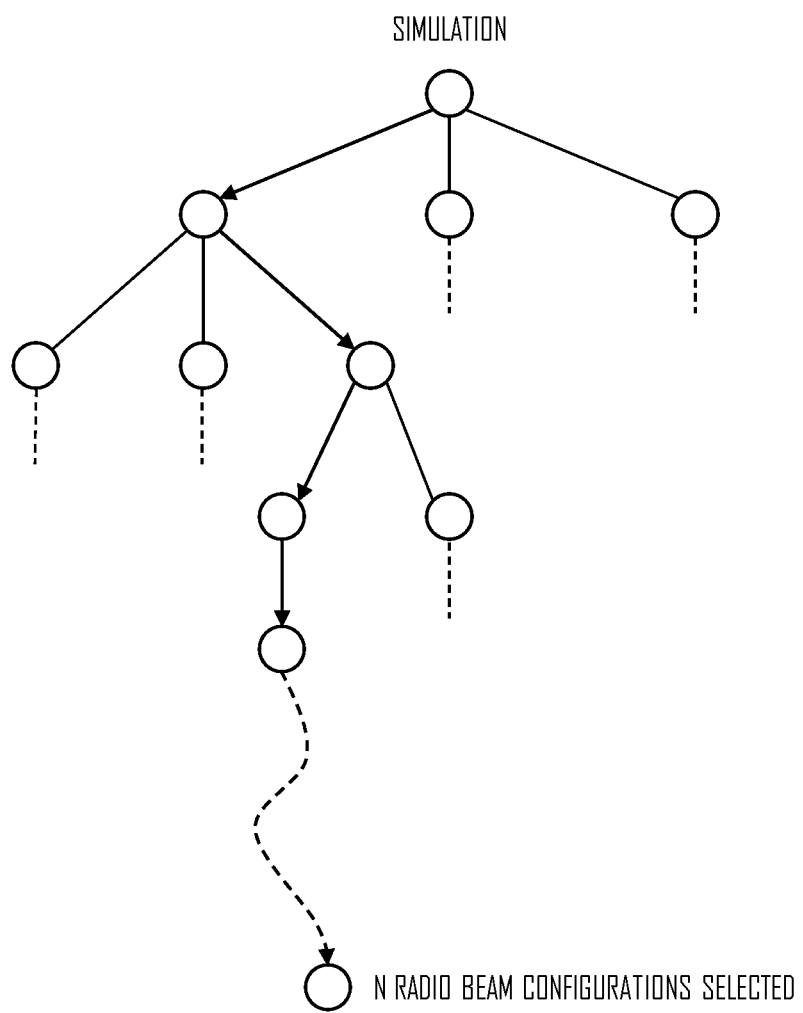
Figure 6D:
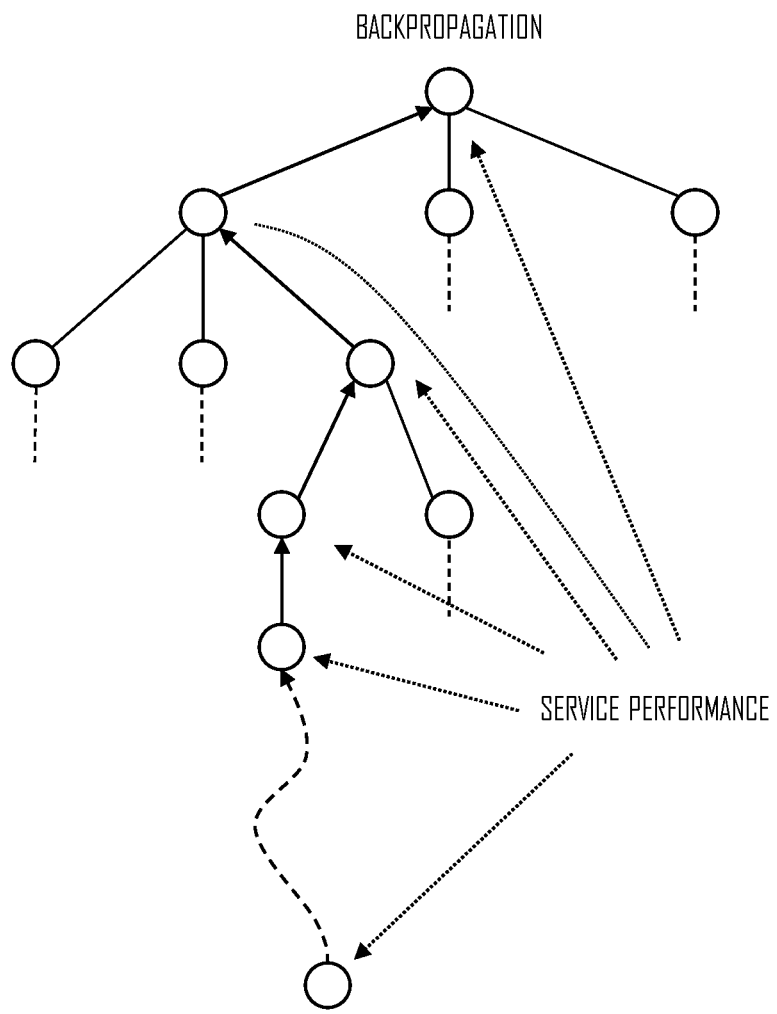

Upon selecting the child node, the remaining radio beam configurations to reach the N radio beam configurations are selected in the simulation step (FIG. 6C). The selection may be arbitrary, e.g. random. Instead of making the simulation purely random, the 'dice' may be balanced, for example by using the channel quality metrics as a criterion. In an embodiment, each node in the simulation step is selected by first selecting a cell in random and, thereafter, selecting a radio beam configuration for the cell randomly but biased by a certain probability. The probability for selecting the radio beam configuration randomly is ∈. The probability for selecting the radio beam configuration on the basis of the channel quality metric is 1−∈, where 0<∈<1. The channel quality metric may be used as the criterion such that the radio beam configuration that maximized an incremental RSRP or similar metric with already selected radio beam configurations becomes selected.

The incremental RSRP for a set of radio beams (RSRP (GoB)) may be defined as $$RSRP(GoB) = \sum_{(x,y,z)} \rho(x, y, z) f^a \left( \max_b L^b(x, y, z) G_b(x, y, z) \right) \quad (7)$$

This embodiment provides fast results and is useful for finding quickly a good set of N radio beam configurations for block 314. In another embodiment, a radio beam configuration is selected across all cells randomly but biased by the certain probability. The probability for selecting the radio beam configuration randomly is E. The probability for selecting the radio beam configuration on the basis of the channel quality metric is 1−∈, where 0<∈<1. In an embodiment, ∈<<1, e.g. ∈<0.1 or ∈<0.01 or ∈<0.001 or ∈=0. ∈=0 may be selected after every radio beam configuration has been selected at least once. Before that, ∈≠0 may be used. The channel quality metric may again be used as the criterion such that the radio beam configuration that maximized an incremental RSRP or similar metric with already selected radio beam configurations becomes selected. This embodiment is slower than the one described above but may result in better exploration, thus providing better set of N radio beam configurations for block 314, given enough processing time. Upon selecting the N radio beam configurations, the process may proceed to blocks 308 and 310 where the cell associations are performed (block 308) and the service performance r(GoB) is computed (block 310), as described above. Upon computing the service performance, the service performance may be backpropagated to each selected radio beam configuration (FIG. 6D), i.e. the same service performance may be stored in association with every radio beam configuration. Upon executing the procedure of block 304 numerous times such that a given radio beam configuration becomes selected in the selection, expansion, and/or simulation multiple times, multiple service performance values becomes stored for the radio beam configuration. This helps in determining the radio beams that have the tendency of providing a high service performance, thus being more probable of getting selected in block 314. In other words, the probability of selecting in step block 314 a radio beam configuration that has a greater service performance, in terms of the stored service performance values, is greater than a probability of selecting a radio beam configuration that has a smaller service performance in terms of the stored service performance values. The same applies to the selection step in the MCTS algorithm.

Figure 7:
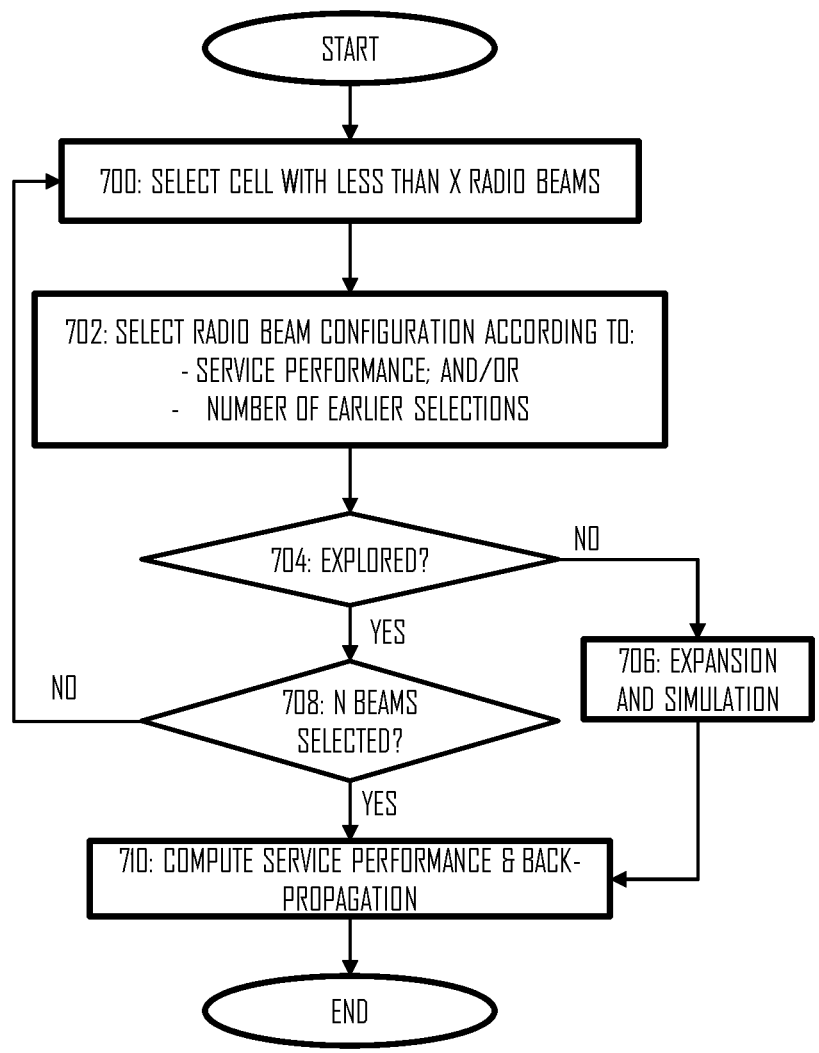
FIG. 7 illustrates a flow diagram of a process for using a Monte-Carlo tree search for selecting the radio beam configurations according to an embodiment.
Figure 8:
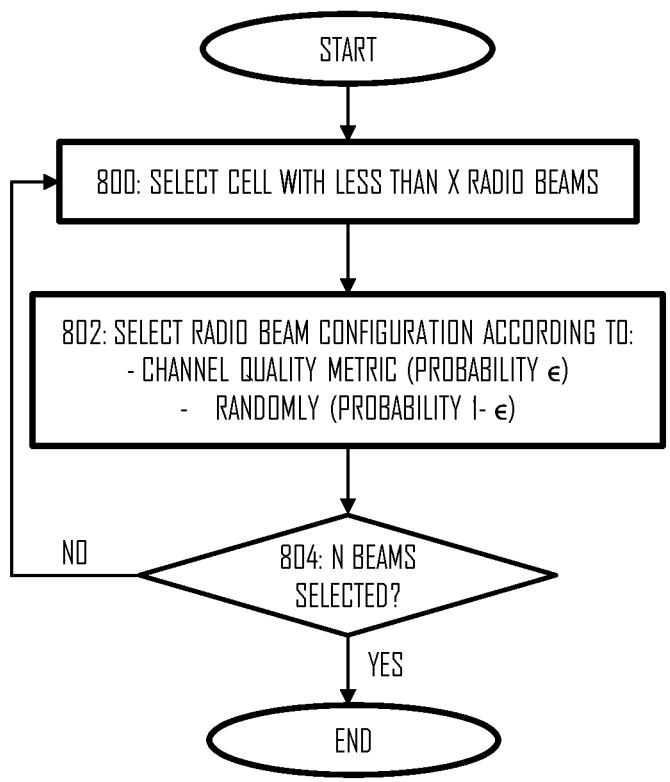
FIG. 8 illustrates an embodiment of a flow diagram of a process for performing a simulation step in the process of FIG. 7.

FIG. 7 illustrates a flow diagram that summarizes the embodiment where block 304 is performed by using the MCTS algorithm. For the sake of simplicity, let us assume that the process selects X radio beam configurations for every cell. In reality, X may be different for different cells. Referring to FIG. 7, the process may start with the selection of a cell for which less than X radio beams is currently selected. In the first iteration, any one of the cells may be selected. In block 702, a radio beam configuration is selected for the cell selected in block 700. As described above, the radio beam configuration may be selected according to Equation (6), for example. In block 704, it is determined whether the selected radio beam configuration is linked in the selection tree to a radio beam configuration that has never yet been selected. In order to make this determination, whenever an expansion is made to a node (radio beam configuration) in the expansion step (FIG. 7B). If there is no such a radio beam configuration, the process proceeds to block 708 where it is checked whether or not the N radio beam configurations have already been selected. If not, the process returns to block 700 to continue the selection step of the MCTS. If the result in block 704 is that there is at least one unexplored radio beam configuration, expansion is made to such a radio beam configuration in block 706. Subsequently, the simulation step is performed to select the remaining radio beam configurations, as described above, thus selecting the remaining radio beam configuration and ending up with N radio beam configurations. FIG. 8 illustrates an embodiment of the simulation in block 706. Referring to FIG. 8, a cell with less than the targeted X radio beams is selected in block 800. In block 802, a radio beam configuration for the selected cell is selected. As described above, parameter E may be used for determining (rolling the dice) whether the selection is random or deterministic. Upon selecting the radio beam configuration, it is checked in block 804 whether N radio beam configurations have now been selected. If not, the process returns to block 800. Otherwise, the process of FIG. 8 ends.

Thereafter, the service performance r(GoB) of the N radio beam configurations is computed in block 710, and the service performance is backpropagated to every radio beam configuration that was selected in block 702 and block 706 (if executed). The backpropagation may be understood as an embodiment of storing the service performances, as described above. Block 710 may thus comprise blocks 308, 310, and 312. If another iteration of the procedure is to be carried out, the procedure may proceed from the "end" to "start" in FIG. 7. As the procedure of FIG. 7 (block 304) is iterated numerous times, the N radio beam configurations may become selected already in the selection step of the MCTS algorithm. In such a case, the procedure of FIG. 7 proceeds from block 708 to block 710 without the expansion and the simulation in block 706.

Depending on the number of cells involved in the process of FIG. 3, the level of complexity selected with the above-described parameters, and the available computational resources, the execution may be time-consuming. However, one advantage of the embodiments is that it provides results even after the first iteration or after a few iterations. Therefore, in case there is a need to change the radio beam configurations currently used by the access nodes, the process of block 304 may be stopped at any time and the new set of N radio beam configurations may be selected (block 314) according to any embodiment described above and allocated to the access nodes.

Figure 9:
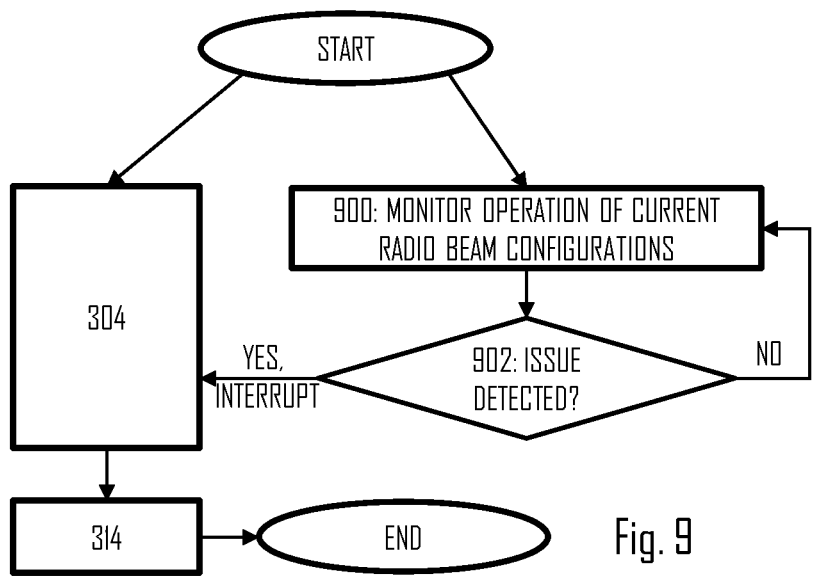
FIG. 9 illustrates an embodiment of a process for taking an output from the process of FIG. 3 during execution of the process.

FIG. 9 illustrates an embodiment where block 304 is iterated during operation of the access nodes and, upon detecting an event in the operation that requires modification of the radio beam configurations currently applied by the access nodes, block 304 is interrupted and block 314 is executed by using the available service performances stored while executing iterations of block 304. Referring to FIG. 9, a current state of the system is that the access nodes operate their respective cells with the currently applied radio beam configurations selected, for example, according to earlier execution of the process of FIG. 3. The access nodes or another network node may monitor the operation of the access nodes in block 900, e.g. the traffic density, a number of radio link failures in the cells, reported channel quality metrics. Meanwhile, the channel quality metrics and the traffic densities for the sub-areas may be collected for the process of FIG. 3. Meanwhile, block 304 may be executed by the radio beam allocator 210 according to any one of the above-described embodiments. Upon detecting an issue in the monitored operation, an interrupt signal is sent to the radio beam allocator 210 to stop the process of FIG. 304 and to provide a new set of N radio beam configurations. In response to the interruption, the radio beam allocator executes block 314 and provides the new set of radio beam configurations for the access nodes.

Figure 10:
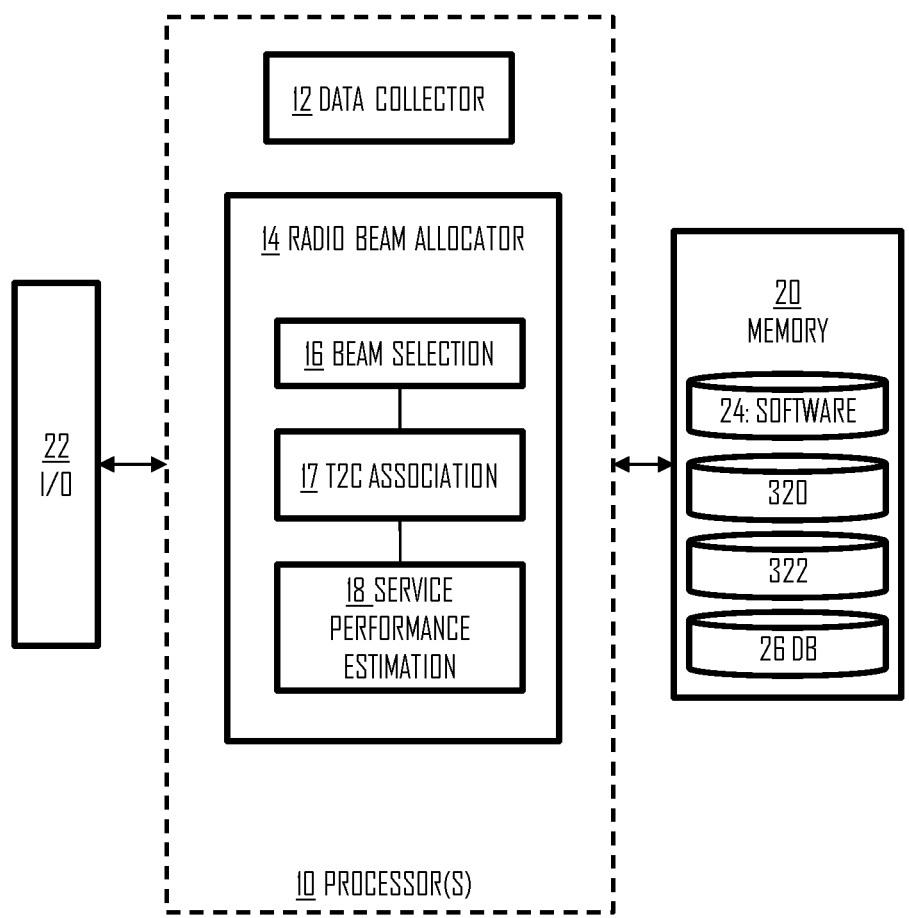
FIG. 10 illustrates a block diagram of a structure of an apparatus according to an embodiment.

FIG. 10 illustrates an apparatus comprising means for carrying out the process of FIG. 3 or any one of the embodiments described above. The apparatus may comprise at least one processor 10 and at least one memory 20 including a computer program code (software) 24, wherein the at least one memory and the computer program code (software) are configured, with the at least one processor, to cause the apparatus to carry out the process of FIG. 3 or any one of its embodiments described above. The apparatus may be for the radio beam allocator 210 comprised in the network infrastructure of the cellular communication system. The apparatus may be a circuitry or an electronic device realizing some embodiments of the invention in the radio beam allocator. The apparatus carrying out the above-described functionalities may thus be comprised in the radio beam allocator, e.g. the apparatus may comprise a circuitry such as a chip, a chipset, a processor, a micro controller, or a combination of such circuitries for the radio beam allocator.

The memory 20 may be implemented using any suitable data storage technology, such as semiconductor-based memory devices, flash memory, magnetic memory devices and systems, optical memory devices and systems, fixed memory and removable memory. The memory 20 may comprise the beam library 320 and the database 322 storing definitions for the sub-areas. Furthermore, the at least one memory 20 may store a database 26 for the channel quality metrics and the traffic densities. In another embodiment, the traffic densities may be stored in the database 322 and the channel quality metrics per radio beam configuration in the beam library 320.

The processor(s) may comprise, as sub-circuitries or sub-modules defined by physical circuits or combinations of the physical circuits and software 24, a data collector module 12 and a radio beam allocator module 14. The data collector 12 may collect the channel quality metrics and the traffic densities during the operation of the access nodes and store the collected data in the memory 20. The radio beam allocator may comprise a beam selection module 16 configured to perform block 306 according to any one of the above-described embodiments, a sub-area-to-cell allocator module 17 configured to make cell associations for the sub-areas for the radio beam configurations selected by the beam selection module (block 308 according to any one of the above-described embodiments), and a service performance estimation module 18 configured to carry out blocks 310 and 312 according to any one of the above-described embodiments. The radio beam allocator 14 may then carry out the selection (block 314) on the basis of the results of the service performance estimation module 18, after the completion of block 304 or upon receiving the interruption (FIG. 9).

The apparatus may further comprise a communication interface 22 comprising hardware and/or software for providing the apparatus with communication capability with the access nodes, as described above. The communication interface 22 may include hardware and software needed for realizing the communications over the required interface of the cellular communication system, e.g. according to specifications of an LTE or 5G interfaces.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIG. 3 or any of the embodiments thereof may also be carried out in the form of one or more computer processes defined by one or more computer programs. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus for allocating N radio beam configurations to access nodes, comprising:
   at least one processor; and
   at least one memory including computer program code, the at least one memory and computer program code configured to, with the at least one processor, cause the apparatus to perform:
   storing, in the at least one memory, a beam library defining a set of radio beam configurations for a coverage area of a plurality of cells managed by the access nodes, wherein each cell is capable of operating multiple radio beam configurations to cover the respective cell;
   dividing the coverage area of the plurality of cells into sub-areas such that a coverage area of a cell comprises a plurality of sub-areas;
   collecting a set of channel quality metrics where each channel quality metric indicates, in one of the sub-areas, channel quality for a radio beam configuration of the beam library;
   collecting a traffic density parameter for each sub-area, the traffic density parameter indicating an amount of data traffic in the sub-area;
   performing the following steps (a) to (d) for a plurality of different sets of N radio beam configurations:
   (a) selecting N radio beam configurations from the set of radio beam configurations,
   (b) mapping, on the basis of the set of channel quality metrics, each sub-area to a radio beam that provides the highest channel quality metric for the N radio beam configurations selected in step (a), thereby performing cell association such that a different number of radio beams is mapped to different cells, and reiterating the cell associations of the sub-areas one-by-one by computing, for a sub-area, a signal-to-interference metric for each of the plurality of cells by considering the other sub-areas associated to different cells as sources of interferences and by selecting a cell providing the greatest signal-to-interference metric, thereby inducing at least one cell change to the mapping;
   (c) computing, on the basis of the mapping and the traffic density parameters, a service performance for the selected N radio beam configurations, wherein the service performance is weighted by the traffic density parameters, and
   (d) storing the service performance as linked to each radio beam configuration of the selected N radio beam configurations;
   selecting, on the basis of the stored service performances, a set of N radio beam configurations and allocating the N radio beam configurations to the access nodes.

2. The apparatus of claim 1, wherein the at least one memory and computer program code are configured to, with the at least one processor, cause the apparatus to perform the steps (a) to (d) for at least a majority of possible combinations of N radio beam configurations in the beam library.

3. The apparatus of claim 1, wherein the at least one memory and computer program code are configured to, with the at least one processor, cause the apparatus to perform said reiterating a plurality of times per sub-area.

4. The apparatus of claim 1, wherein the at least one memory and computer program code are configured to, with the at least one processor, cause the apparatus to determine a fairness parameter defining a target between a maximum throughput and a maximum coverage for the set of N radio beam configurations, to compute the service performance for the selected N radio beam configurations in step (c) by using the fairness parameter, and to select the set of N radio beam configurations based upon the computed service performances.

5. The apparatus of claim 1, wherein said N radio beam configurations comprise a determined number of radio beam configurations per cell, and wherein the at least one memory and computer program code are configured to, with the at least one processor, cause the apparatus to perform steps (a) by using a Monte-Carlo tree search algorithm using a selection tree formed of the radio beam configurations in the beam library and comprising the following steps:
(i) selecting a cell and a radio beam configuration for the cell, wherein the radio beam configuration is selected on the basis of stored service performances of the radio beam configurations, if any, and the number of times each radio beam configuration has already been selected in previous iterations of step (a), if any;
(ii) determining whether or not the selected radio beam configuration is linked in the selection tree to a radio beam configuration that has been previously selected in another iteration of step (a) and,
if said another radio beam configuration has been previously selected, returning to step (i) to select a further radio beam configuration;
if said another radio beam configuration has not been previously selected, proceeding to step (iii);
(iii) selecting arbitrarily the remaining radio beam configurations such that said N radio beam configurations are selected.

6. The apparatus of claim 5, wherein the at least one memory and computer program code are configured to, with the at least one processor, cause the apparatus to perform in step (b) at least the following:
(I) computing, for a sub-area, a signal-to-interference metric for each of the cells by considering the other sub-areas associated to different cells as sources of interference and selecting a cell association for the sub-area on the basis of the computed signal-to-interference metrics; and
(II) repeating step (I) for the sub-area and the other sub-areas a plurality of times before proceeding to step (c).

7. The apparatus of claim 1, wherein the at least one memory and computer program code are configured to, with the at least one processor, cause the apparatus to perform steps (a) to (d) during operation of the access nodes, to detect an event in the operation that requires modification of the radio beam configurations currently applied by the access nodes, to interrupt, in response to the detection, said performing the steps (a) to (d) and to select the set of N radio beam configurations on the basis of the available stored service performances.

8. A computer-implemented method for allocating N radio beam configurations to access nodes, comprising:
storing, in at least one memory, a beam library defining a set of radio beam configurations for a coverage area of a plurality of cells managed by the access nodes, wherein each cell is capable of operating multiple radio beam configurations to cover the respective cell;
dividing the coverage area of the plurality of cells into sub-areas such that a coverage area of a cell comprises a plurality of sub-areas;
collecting a set of channel quality metrics where each channel quality metric indicates, in one of the sub-areas, channel quality for a radio beam configuration of the beam library;
collecting a traffic density parameter for each sub-area, the traffic density parameter indicating an amount of data traffic in the sub-area;
performing the following steps (a) to (d) for a plurality of different sets of N radio beam configurations:
(a) selecting N radio beam configurations from the set of radio beam configurations,
(b) mapping, on the basis of the set of channel quality metrics, each sub-area to a radio beam that provides the highest channel quality metric for the N radio beam configurations selected in step (a), thereby performing cell association such that a different number of beams is mapped to different cells, and reiterating the cell associations of the sub-areas one-by-one by computing, for a sub-area, a signal-to-interference metric for each of the plurality of cells by considering the other sub-areas associated to different cells as sources of interferences and by selecting a cell providing the greatest signal-to-interference metric, thereby inducing at least one cell change to the mapping;
(c) computing, on the basis of the mapping and the traffic density parameters, a service performance for the selected N radio beam configurations, wherein the service performance is weighted by the traffic density parameters, and
(d) storing the service performance as linked to each radio beam configuration of the selected N radio beam configurations;
selecting, on the basis of the stored service performances, a set of N radio beam configurations and allocating the N radio beam configurations to the access nodes.

9. The method of claim 8, wherein the steps (a) to (d) are performed for at least a majority of possible combinations of N radio beam configurations in the beam library.

10. The method of claim 8, wherein said reiterating is performed a plurality of times per sub-area.

11. The method of claim 8, further comprising determining a fairness parameter defining a target between a maximum throughput and a maximum coverage for the set of N radio beam configurations, computing the service performance for the selected N radio beam configurations in step (c) by using the fairness parameter, and selecting the set of N radio beam configurations on the basis of the computed service performances.

12. The method of claim 8, wherein said N radio beam configurations comprise a determined number of radio beam configurations per cell, and wherein the steps (a) are performed by using a Monte-Carlo tree search algorithm using a selection tree formed of the radio beam configurations in the beam library and comprising the following steps:
(i) selecting a cell and a radio beam configuration for the cell, wherein the radio beam configuration is selected on the basis of stored service performances of the radio beam configurations, if any, and the number of times each radio beam configuration has already been selected in previous iterations of step (a), if any;

(ii) determining whether or not the selected radio beam configuration is linked in the selection tree to a radio beam configuration that has been previously selected in another iteration of step (a) and, if said another radio beam configuration has been previously selected, returning to step (i) to select a further radio beam configuration;

if said another radio beam configuration has not been previously selected, proceeding to step (iii);

(iii) selecting arbitrarily the remaining radio beam configurations such that said N radio beam configurations are selected.

13. The method of claim 12, further comprising in step (b) at least the following:

(I) computing, for a sub-area, a signal-to-interference metric for each of the cells by considering the other sub-areas associated to different cells as sources of interference and selecting a cell association for the sub-area on the basis of the computed signal-to-interference metrics; and (II) repeating step (I) for the sub-area and the other sub-areas a plurality of times before proceeding to step (c).

14. The method of claim 8, wherein steps (a) to (d) are performed during operation of the access nodes, and wherein upon detecting an event in the operation that requires modification of the radio beam configurations currently applied by the access nodes, said performing the steps (a) to (d) is interrupted and the set of N radio beam configurations is selected on the basis of the available stored service performances.

15. A computer program embodied on a non-transitory computer-readable medium, said computer program comprising a computer program code readable by a computer, wherein the computer program code configures the computer to carry out a computer process for allocating N radio beam configurations to access nodes, the computer process comprising:

storing, in at least one memory, a beam library defining a set of radio beam configurations for a coverage area of a plurality of cells managed by the access nodes, wherein each cell is capable of operating multiple radio beam configurations to cover the respective cell;

dividing the coverage area of the plurality of cells into sub-areas such that a coverage area of a cell comprises a plurality of sub-areas;

collecting a set of channel quality metrics where each channel quality metric indicates, in one of the sub-areas, channel quality for a radio beam configuration of the beam library;

collecting a traffic density parameter for each sub-area, the traffic density parameter indicating an amount of data traffic in the sub-area;

performing the following steps (a) to (d) for a plurality of different sets of N radio beam configurations:

(a) selecting N radio beam configurations from the set of radio beam configurations, (b) mapping, on the basis of the set of channel quality metrics, each sub-area a radio beam that provides the highest channel quality metric for the N radio beam configurations selected in step (a), thereby performing cell association such that a different number of beams is mapped to different cells, and reiterating the cell associations of the sub-areas one-by-one by computing, for a sub-area, a signal-to-interference metric for each of the plurality of cells by considering the other sub-areas associated to different cells as sources of interferences and by selecting a cell providing the greatest signal-to-interference metric, thereby inducing at least one cell change to the mapping;

(c) computing, on the basis of the mapping and the traffic density parameters, a service performance for the selected N radio beam configurations, wherein the service performance is weighted by the traffic density parameters, and (d) storing the service performance as linked to each radio beam configuration of the selected N radio beam configurations;

selecting, on the basis of the stored service performances, a set of N radio beam configurations and allocating the N radio beam configurations to the access nodes.

* * * * *